(12) United States Patent
Wu

(10) Patent No.: US 9,933,003 B2
(45) Date of Patent: Apr. 3, 2018

(54) ANTI-VIBRATION RIVET

(71) Applicant: Yi-Chang Wu, Taoyuan (TW)

(72) Inventor: Yi-Chang Wu, Taoyuan (TW)

( * ) Notice: Subject to any disclaimer, the term of this patent is extended or adjusted under 35 U.S.C. 154(b) by 60 days.

(21) Appl. No.: 15/166,304

(22) Filed: May 27, 2016

(65) Prior Publication Data

US 2016/0348707 A1  Dec. 1, 2016

(30) Foreign Application Priority Data

Jun. 1, 2015 (CN) ..................... 2015 2 0365961 U

(51) Int. Cl.
*F16B 19/10* (2006.01)
*F16B 13/06* (2006.01)
*F16B 5/04* (2006.01)

(52) U.S. Cl.
CPC ................ *F16B 19/10* (2013.01); *F16B 5/04* (2013.01); *F16B 13/06* (2013.01); *F16B 19/1081* (2013.01)

(58) Field of Classification Search
CPC ........ F16B 5/04; F16B 13/06; F16B 13/0816; F16B 13/126; F16B 19/10; F16B 19/1027; F16B 19/1081; F16B 2019/1018
USPC .......... 411/45, 57.1, 60.1, 501, 509
See application file for complete search history.

(56) References Cited

U.S. PATENT DOCUMENTS

| | | | | |
|---|---|---|---|---|
| 4,276,806 A * | 7/1981 | Morel | ................ | F16B 19/1081 411/15 |
| 4,375,342 A * | 3/1983 | Wollar | ............. | F16L 319/1081 411/41 |
| 4,391,559 A * | 7/1983 | Mizusawa | ............. | F16L 313/12 411/41 |
| 4,405,272 A * | 9/1983 | Wollar | ................ | F16B 19/1081 411/41 |
| 6,089,805 A * | 7/2000 | Salmon | ............... | F16B 19/1081 411/40 |
| 6,364,586 B1 * | 4/2002 | Okada | ................. | F16B 19/1081 411/41 |
| 7,862,272 B2 * | 1/2011 | Nakajima | ........... | F16B 19/1081 411/41 |
| 2001/0022923 A1 * | 9/2001 | Arisaka | .................... | F16B 5/123 411/45 |
| 2003/0143053 A1 * | 7/2003 | Kanie | .................... | F16B 5/0642 411/45 |
| 2005/0123372 A1 * | 6/2005 | Sato | ....................... | F16B 5/0258 411/32 |

* cited by examiner

*Primary Examiner* — Roberta S Delisle
(74) *Attorney, Agent, or Firm* — Bacon & Thomas, PLLC

(57) ABSTRACT

The present invention relates to an anti-vibration rivet, which comprises a core shaft and a sleeve. The core shaft including a head part and a shaft part, all of which are forming an overlap space, the head part is provided with an interlocking rabbet. The sleeve including a flange part and a fork part, all of which are forming an inner rabbet, the flange part is provided with an interlocking part which is engaged with the interlocking rabbet. With the structural design of the interlocking rabbet of the head part and the interlocking part of the flange part can improve the mutual fixing ability between the core shaft and the sleeve. And articles fixed by the anti-vibration rivet can have better stability.

9 Claims, 6 Drawing Sheets

US 9,933,003 B2

ANTI-VIBRATION RIVET

CROSS REFERENCE TO RELATED APPLICATION

This application claims the benefits of the Chinese Patent Application Ser. No. 201520365961.2, filed on Jun. 1, 2015, the subject matter of which is incorporated herein by reference.

BACKGROUND OF THE INVENTION

1. Field of the Invention

The present invention relates to an anti-vibration rivet, more particularly, to a rivet for resisting vibration.

2. Description of Related Art

Industrial or interior design often uses a rivet as a fixing component to connect different articles. Drilling hole at overlapping place of two articles, then insert a rivet to fix. Rivet is a mechanical fixing component which is different from nail or screw. When fixing article by rivet, the rivet cannot be removed by non-destructive method such as nail or screw. In order to make the rivet and article separated, rivet or article must be destroyed.

Referring to FIG. 1 to FIG. 4, which are a schematic perspective view, a schematic cross-sectional view, a schematic assembled cross-sectional view and a schematic assembled perspective cross-sectional view of the rivet in the prior art respectively. The rivet 1 in the prior art comprises: a core shaft 11 and a sleeve 12. The core shaft 11 including a head part 111 and a shaft part 112, all of which are forming an overlap space 113. The sleeve 12 including a flange part 121 and a fork part 122, all of which are forming an inner rabbet 123, the fork part 122 is forming a fork hole 1221.

The principle of the rivet 1 to fix articles in the prior art is to dispose the sleeve 12 at the drilled hole of the article, then insert the core shaft 11 into the inner rabbet 123. Providing an impact force to the head part 111 of the core shaft 11, the shaft part 112 of the core shaft 11 passes through the fork hole 1221 of the fork part 122 of the sleeve 12 by impact force. In the same time, the fork part 122 of the sleeve 12 will be expanded outward and pushes the article to achieve the fixing function of the rivet 1.

However, after connecting the articles by the rivet 1, even though the top end of the flange part 121 of the sleeve 12 (referring to FIG. 3) is disposed within the overlap space 113 of the core shaft 11, it is only a mutual fitting shape in structural design. When the article is under vibrating, the shaft part 112 of the core shaft 11 may be pushed upward by the fork part 122 of the sleeve 12, so that the core shaft 11 drops out and the fixing function of the rivet 1 is lost.

To solve the above-mentioned problem, persistent research and experiments for "an anti-vibration rivet with interlocking structure" has been undertaken, eventually resulting in accomplishment of the present invention.

SUMMARY OF THE INVENTION

An object of the present invention is to provide an anti-vibration rivet, which can improve the fixing ability of the core shaft and the sleeve, and the inventor describes in the following manner.

To achieve the object, there is provided an anti-vibration rivet, which comprises a core shaft and a sleeve. The core shaft including a head part and a shaft part, all of which are forming an overlap space, the head part is provided with an interlocking rabbet. The sleeve including a flange part and a fork part, all of which are forming an inner rabbet, the flange part is provided with an interlocking part which is engaged with the interlocking rabbet.

The interlocking part is installed within the overlap space to protect the engaged portion of the core shaft and the sleeve. The fork part is forming at least one fork hole which makes the shaft part of the core shaft passing through the sleeve and being installed.

The width of the fork hole may be narrower than the width of the shaft part and the height of the inner rabbet may be lower than the height of the shaft part. Therefore, the fork part of the sleeve can be expanded outward and fix the anti-vibration rivet by the counterforce of the connected article.

The core shaft may be made by plastic material. The sleeve may be made by plastic material. The head part and the shaft part are formed integrally. The flange part and the fork part are formed integrally. In this way, it is easy to connect article made by plastic material or woody material.

Other objects, advantages, and novel features of the present invention will become more apparent from the following detailed descriptions when taken in conjunction with the accompanying drawings.

DETAILED DESCRIPTION OF THE PREFERRED EMBODIMENTS

Figure 1:
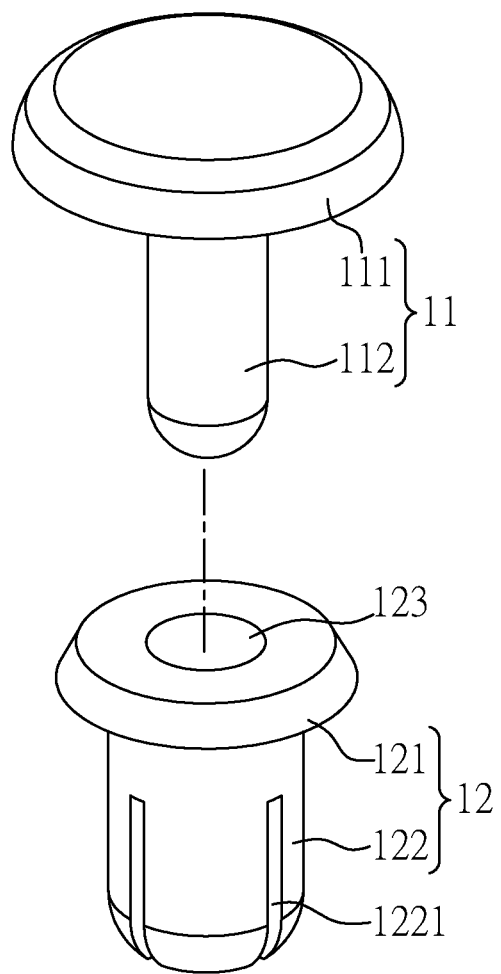
FIG. 1 is a schematic perspective view of the rivet in the prior art.
Figure 2:
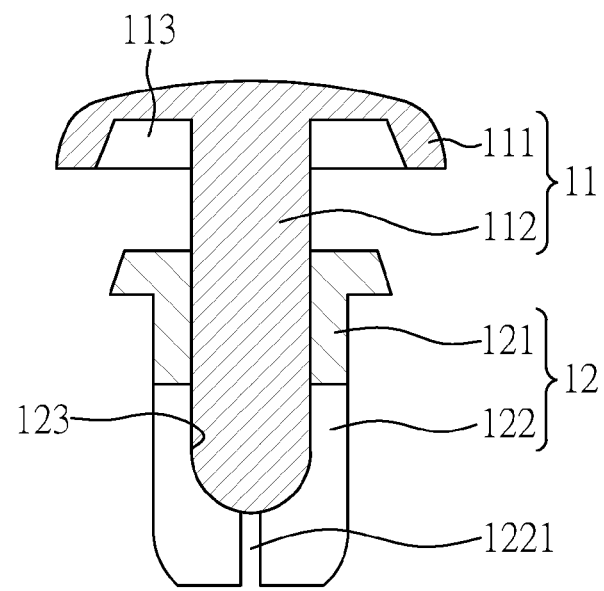
FIG. 2 is a schematic cross-sectional view of the rivet in the prior art.
Figure 3:
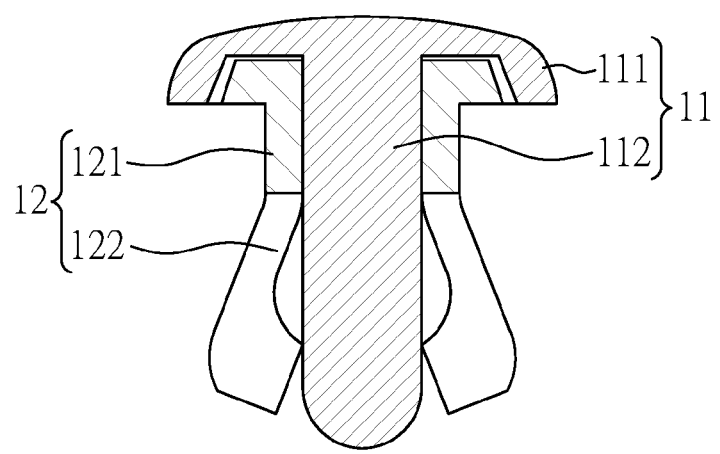
FIG. 3 is a schematic assembled cross-sectional view of the rivet in the prior art.
Figure 4:
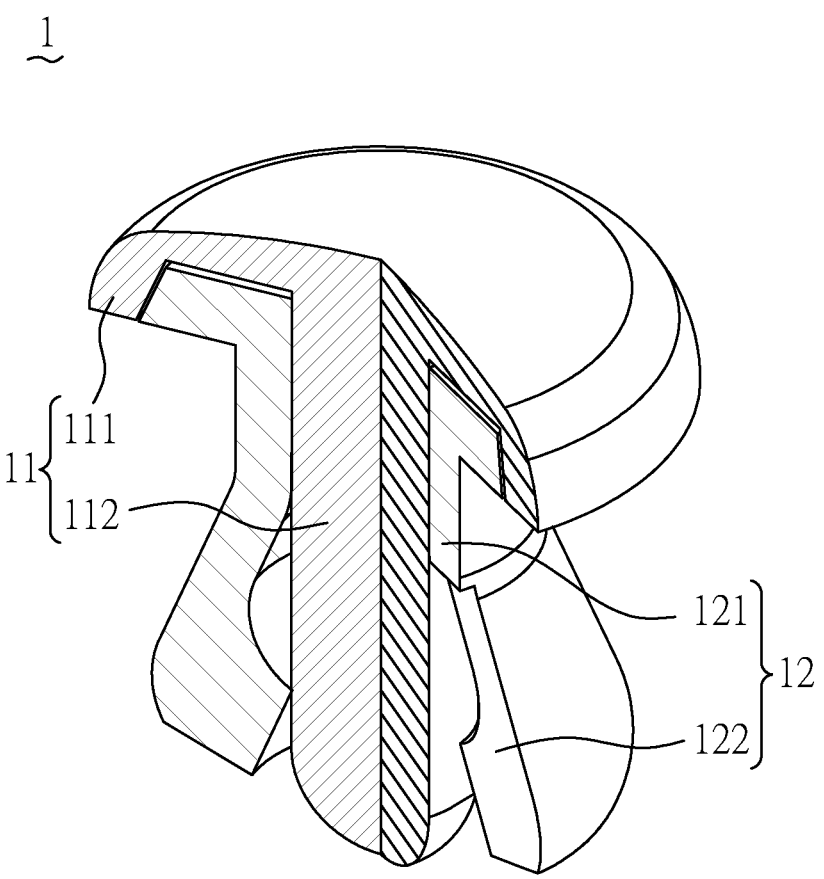
FIG. 4 is a schematic assembled perspective cross-sectional view of the rivet in the prior art.

Referring to FIG. 5 to FIG. 8, which are a schematic perspective view, a schematic cross-sectional view, a schematic assembled cross-sectional view and a schematic assembled perspective cross-sectional view of the anti-vibration rivet according to a preferred embodiment of the present invention respectively.

An anti-vibration rivet 2 of the embodiment comprises: a core shaft 21 and a sleeve 22. The core shaft 21 includes a head part 211 and a shaft part 212, all of which are forming an overlap space 213, the head part 211 is provided with an interlocking rabbet 2111. The sleeve 22 includes a flange part 221 and a fork part 222, all of which are forming an inner rabbet 223, the flange part 221 is provided with an interlocking part 2211 which is engaged with the interlocking rabbet 2111. The fork part 222 is forming at least one fork hole 2221 which makes the shaft part 212 passing through and being installed.

The interlocking part 2211 of the flange part 221 of the sleeve 22 is installed within the overlap space 213 of the core shaft 21 to make the interlocking rabbet 2111 of the head part 211 of the core shaft 21 and the interlocking part 2211 of the flange part 221 of the sleeve 22 acquiring protection. In this way, external environmental factors affecting mutual engaging structural strength of the interlocking rabbet 2111 and the interlocking part 2211 can be avoided. In the present embodiment, the interlocking rabbet 2111 and the interlocking part 2211 are serrated structures which engage each other respectively, but the present invention is not limited to aforementioned shape, the main concept is that the structural design of the interlocking rabbet 2111 and the interlocking part 2211 can engage each other.

Figure 5:
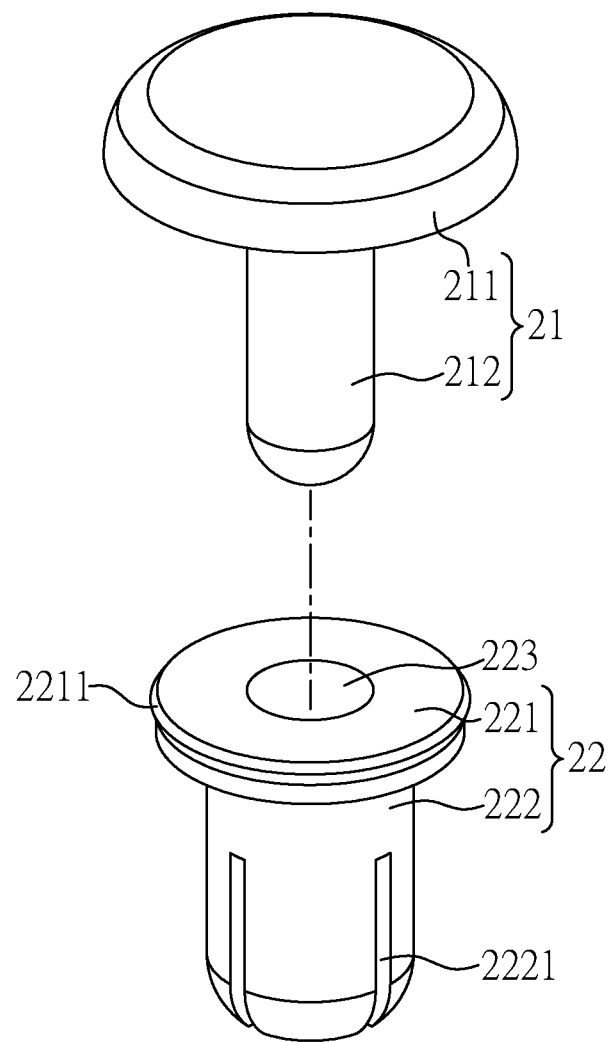
FIG. 5 is a schematic perspective view of the anti-vibration rivet according to a preferred embodiment of the present invention.
Figure 6:
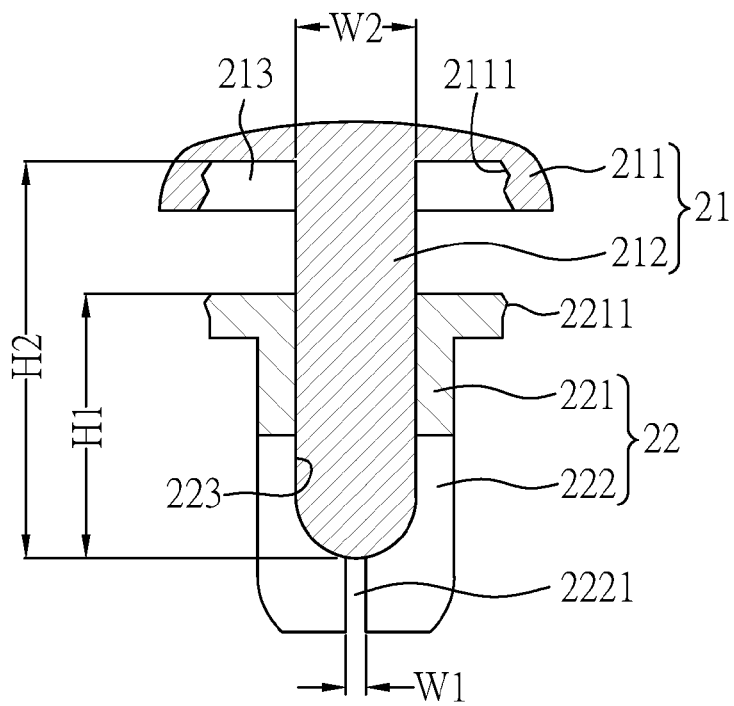
FIG. 6 is a schematic cross-sectional view of the anti-vibration rivet according to a preferred embodiment of the present invention.
Figure 7:
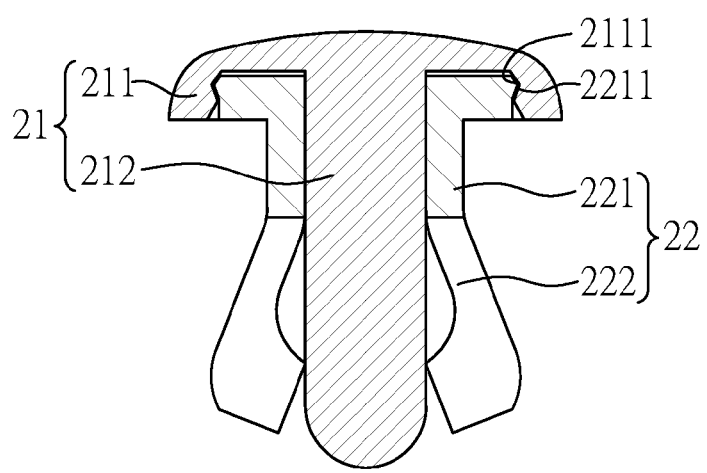
FIG. 7 is a schematic assembled cross-sectional view of the anti-vibration rivet according to a preferred embodiment of the present invention.
Figure 8:
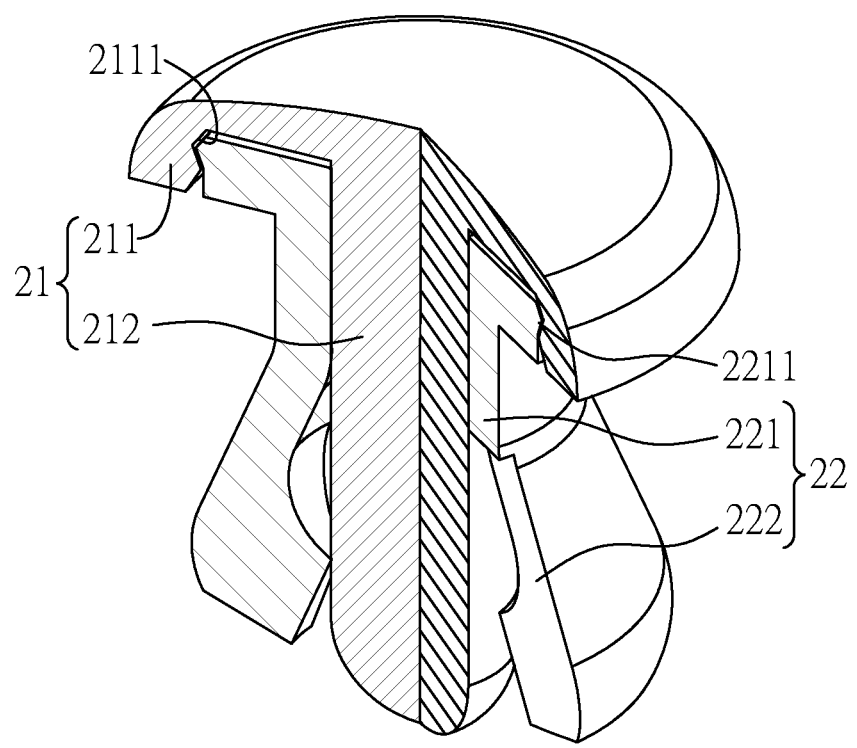
FIG. 8 is a schematic assembled perspective cross-sectional view of the anti-vibration rivet according to a preferred embodiment of the present invention.

When providing an impact force to the head part 211 of the core shaft 21 for fixing the anti-vibration rivet 2, the fork hole 2221 of the fork part 222 of the sleeve 22 works as passing route of shaft part 212 of core shaft 21. Referring to FIG. 5 and FIG. 6, it is inferable that the fork hole 2221 in the present invention is a cross-shaped (+-shaped) opening from bottom side view, but the present invention is not limited to aforementioned shape, the fork hole 2221 can be formed as a "--shaped" opening, "*-shaped" opening, etc. To meet the actual needs is the main concept.

The height H1 of the inner rabbet 223 of the sleeve 22 is lower than the height H2 of the shaft part 212 of the core shaft 21. The width W1 of the fork hole 2221 of the fork part 222 of the sleeve 22 is narrower than the width W2 of the shaft part 212 of the core shaft 21. In this way, when the fork part 222 of the sleeve 22 is pushed by the shaft part 212 of the core shaft 21, the fork part 222 will be expanded outward to fix the connected article.

The core shaft 21 is made by plastic material. The sleeve is made by plastic material. In this way, the anti-vibration rivet 2 of the present invention can easily apply to the article made by plastic material or woody material.

In addition, the head part 211 and the shaft part 212 of the core shaft 21 are formed integrally. The flange part 221 and the fork part 222 of the sleeve 22 are formed integrally.

From the foregoing, the anti-vibration rivet 2 in the present invention uses the design of the interlocking rabbet 2111 of the head part 211 of the core shaft 21 and the interlocking part 2211 of the flange part 221 of the sleeve 22 to prevent the core shaft 21 dropping out from the sleeve 22 by vibration force. Therefore, the articles which are connected by the anti-vibration rivet 2 can connect each other more stably.

Although the present invention has been explained in relation to its preferred embodiments, it is to be understood that many other possible modifications and variations can be made without departing from the scope of the invention as hereinafter claimed.

What is claimed is:

1. An anti-vibration rivet, comprising:
   A core shaft, including a head part and a shaft part, all of which are forming an overlap space, the head part is provided with an interlocking rabbet; and
   A sleeve, including a flange part and a fork part, all of which are forming an inner rabbet, the flange part is provided with an interlocking part which is engaged with the interlocking rabbet, wherein a volume of the flange part located in the overlap space is approximately the same as or equal to a volume of the overlap space, and the interlocking part is formed far away from the shaft part.

2. The anti-vibration rivet as claimed in claim 1, wherein the interlocking part is installed within the overlap space.

3. The anti-vibration rivet as claimed in claim 1, wherein the fork part is forming at least one fork hole which makes the shaft part passing through and being installed.

4. The anti-vibration rivet as claimed in claim 3, wherein a width of the fork hole is narrower than a width of the shaft part.

5. The anti-vibration rivet as claimed in claim 1, wherein a height of the inner rabbet is lower than a height of the shaft part.

6. The anti-vibration rivet as claimed in claim 1, wherein the core shaft is made by plastic material.

7. The anti-vibration rivet as claimed in claim 1, wherein the sleeve is made by plastic material.

8. The anti-vibration rivet as claimed in claim 1, wherein the head part and the shaft part are formed integrally.

9. The anti-vibration rivet as claimed in claim 1, wherein the flange part and the fork part are formed integrally.

* * * * *